(12) United States Patent
Kuell et al.

(10) Patent No.: US 10,037,390 B2
(45) Date of Patent: Jul. 31, 2018

(54) TECHNIQUES TO SIMULATE PRODUCTION EVENTS

(71) Applicant: SAS Institute Inc., Cary, NC (US)

(72) Inventors: James P. Kuell, Raleigh, NC (US);
Robert N. Bonham, Raleigh, NC (US);
Bryan M. Ellington, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1012 days.

(21) Appl. No.: 14/267,206

(22) Filed: May 1, 2014

(65) Prior Publication Data

US 2014/0365198 A1    Dec. 11, 2014

Related U.S. Application Data

(60) Provisional application No. 61/831,793, filed on Jun. 6, 2013.

(51) Int. Cl.
*G06G 7/62* (2006.01)
*G06F 17/50* (2006.01)

(52) U.S. Cl.
CPC ...... *G06F 17/5009* (2013.01); *G06F 17/5022* (2013.01); *G06F 2217/86* (2013.01)

(58) Field of Classification Search
CPC ............. G06F 17/5009; G06F 17/5002; G06F 2217/86
(Continued)

(56) References Cited

U.S. PATENT DOCUMENTS 5,940,472 A    8/1999  Newman et al.
6,697,964 B1   2/2004  Dodrill et al.
(Continued)

OTHER PUBLICATIONS

Nejad et al. "Hierarchical Planning and Multi-Level Scheduling for Simulation-Based Probabilistic Risk Assessment". 2007 IEEE. p. 1189-1197.*

(Continued)

*Primary Examiner* — Eunhee Kim

(57) ABSTRACT

Techniques to simulate production events are described. Some embodiments are particularly directed to techniques to simulate production events based on randomization across a distribution of production events. In one embodiment, for example, an apparatus may comprise a simulation application operative to simulate one or more commands in a simulated environment using a task hierarchy, the simulation application comprising a configuration component, a command generation component, and an execution component, wherein simulating the one or more commands comprises executing one or more task commands. The configuration component may be operative to receive the task hierarchy from the data store, the task hierarchy comprising a plurality of task entries, each task entry comprising a list of task entries or a task command, the list of task entries comprising probabilities associated with each task entry in the list of task entries, wherein task commands correspond to the simulated environment representing a production environment. The command generation component may be operative to determine the one or more task commands by traversing through the task hierarchy based on the associated probabilities until the one or more task commands are reached. The execution component may be operative to execute the one or more task commands as one or more simulated commands in the simulated environment. Other embodiments are described and claimed.

36 Claims, 11 Drawing Sheets

(58) Field of Classification Search
USPC .......................................................... 703/17
See application file for complete search history.

(56) References Cited

U.S. PATENT DOCUMENTS

| | | | |
|---|---|---|---|
| 7,558,565 B2 | 7/2009 | Miller et al. | |
| 7,779,044 B2 | 8/2010 | Matsuo et al. | |
| 7,818,746 B2 | 10/2010 | Anderson | |
| 7,894,384 B2 | 2/2011 | Khamar | |
| 8,214,194 B2* | 7/2012 | Bank | G06F 11/3428 703/22 |
| 2003/0139918 A1* | 7/2003 | Hardwick | G06F 9/5011 703/22 |
| 2008/0209425 A1* | 8/2008 | Ferris | G06F 9/45537 718/102 |

OTHER PUBLICATIONS

Weigle et al., "Tmix: A Tool for Generating Realistic TCP Application Workloads in ns-2", ACM SIGCOMM Computer Communication Review, vol. 36, No. 3, Jul. 2006, 10 pages.

* cited by examiner

700

Receive a task hierarchy from a data store, the task hierarchy comprising a plurality of task entries, each task entry comprising a list of task entries or a task command, the list of task entries comprising probabilities associated with each task entry in the list of task entries, wherein task commands correspond to a simulated environment representing a production environment.
702

Simulate one or more commands in the simulated environment using the task hierarchy, wherein simulating each of the one or more commands comprises traversing through the task hierarchy based on the associated probabilities until a task command is reached and executing the task command as a simulated command in the simulated environment.
704

*FIG. 7*

TECHNIQUES TO SIMULATE PRODUCTION EVENTS

RELATED APPLICATIONS

This application claims the benefit of priority under 35 U.S.C. § 119(e) to U.S. Provisional Application Ser. No. 61/831,793, filed Jun. 6, 2013, the entirety of which is incorporated herein by reference.

BACKGROUND

Events may occur within a production environment. For instance, a computer may have memory allocated or deallocated, disk space reserved or released, files written to or erased, processing resources may be used over a period of time, etc. In a working production environment these events may be the authentic result of actual tasks being performed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to simulate production events. Some embodiments are particularly directed to techniques to simulate production events based on randomization across a distribution of production events. In one embodiment, for example, an apparatus may comprise a simulation application operative to simulate one or more commands in a simulated environment using a task hierarchy, the simulation application comprising a configuration component, a command generation component, and an execution component, wherein simulating the one or more commands comprises executing one or more task commands. The configuration component may be operative to receive the task hierarchy from the data store, the task hierarchy comprising a plurality of task entries, each task entry comprising a list of task entries or a task command, the list of task entries comprising probabilities associated with each task entry in the list of task entries, wherein task commands correspond to the simulated environment representing a production environment. The command generation component may be operative to determine the one or more task commands by traversing through the task hierarchy based on the associated probabilities until the one or more task commands are reached. The execution component may be operative to execute the one or more task commands as one or more simulated commands in the simulated environment. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an example of a logic flow for the simulation system of FIG. 1.

DETAILED DESCRIPTION

Figure 1:
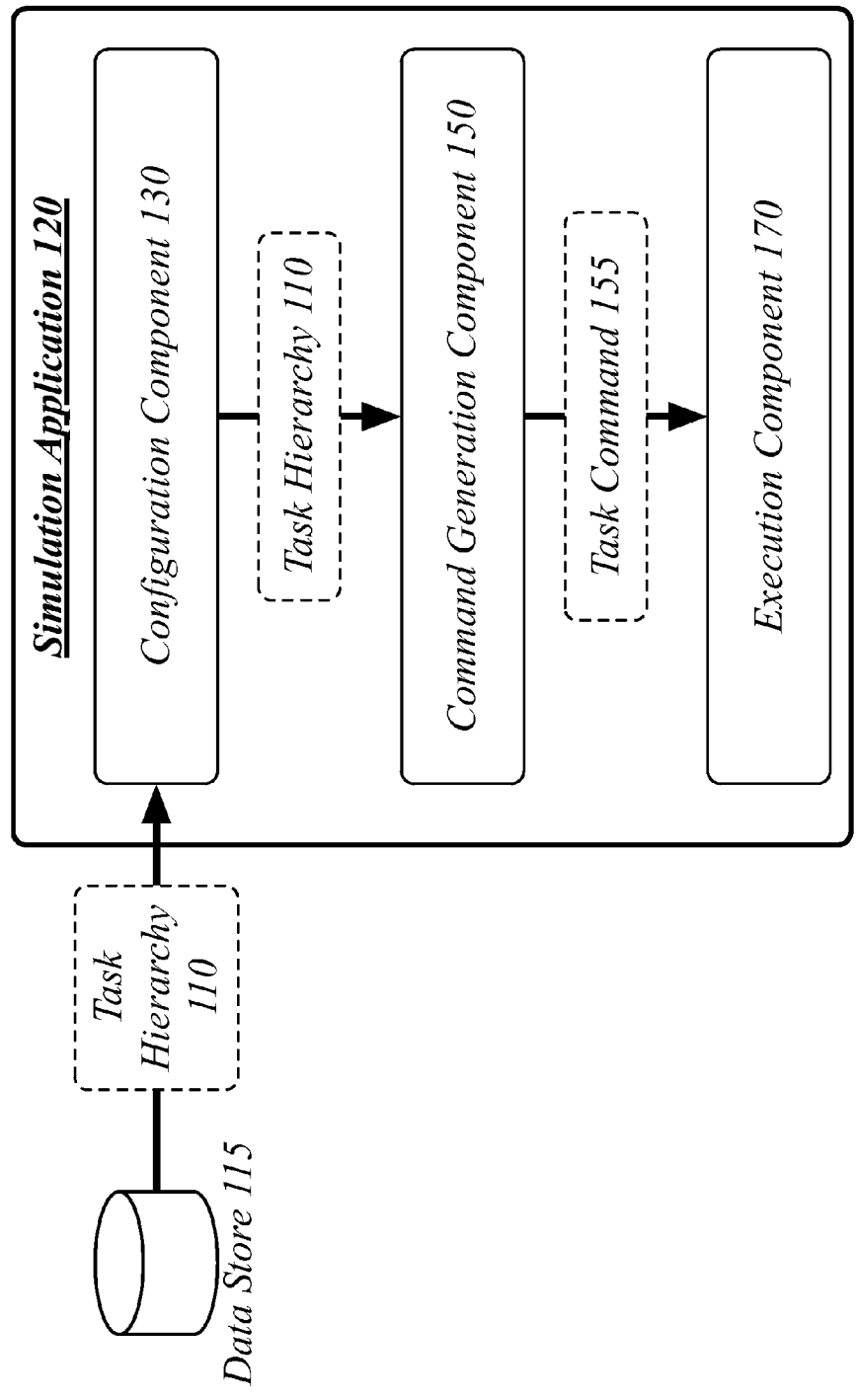
FIG. 1 illustrates an example of a simulation system.

Computer systems running programs, performing tasks, or otherwise engaging in computation may be monitored for the occurrence of particular events. Example events include creating new files, instantiating new threads or processes, making log entries, and various other descriptions of computer behavior at various levels of granularity. Monitoring software may provide insight into internal behavior of a computer, computer cluster, distributed cluster, or other collection of computational resources that might not otherwise be visible to an operator. This monitoring software may aid the maintainer or administrator in maintaining and administrating their computing resources: knowing whether to provide additional or upgraded computers, knowing whether resources are available for additional tasks, and generally analyzing the efficiency, capacity, and performance of their existing resources.

However, the development, testing, and demonstration of monitoring systems may be impeded by a lack of data prior to deployment. Where a system is intended to monitor a distributed cluster of computers, it may be impractical to use a real distributed cluster running live tasks to develop, test, or demonstrate the monitoring software. While production hardware may be desirable to periodically use to ensure or demonstrate reasonable performance on production hardware, more testing or demonstration may be desired than is practical to perform on production hardware. Implementations described herein can provide access to a set or sequence of events that represent the behavior of a production system so that a simulation may be performed without occupying the resources of a production system.

In some cases, merely replaying the events previously logged from a production system may suffice. However, such replays are limited to sequences of events that actually occurred. A system for creating simulated events may be useful for generating particular monitoring scenarios for the simulated system. For example, a first scenario may be created simulating where a monitored computer system behaves normally under moderate load. A second scenario may be created simulating where the system is struggling under heavy load. A third scenario may be created simulating where the system is encountering hardware failures. A fourth scenario may be created simulating where the system is experiencing underutilization. In general, a scenario may be created for any normal or atypical behavior of a computer system. These various scenarios may be used in any of the development, testing, or demonstration of a monitoring system, to either confirm to the developer or demonstrate to a potential client that the monitoring system will alert a user to the occurrence of an undesirable situation or reassure them as to the proper operation of the computing system. As a result, the embodiments described herein can improve the affordability, scalability, modularity, and/or extendibility for testing a monitoring system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a simulation system 100. In one embodiment, the simulation system 100 may be a computer-implemented system having a software simulation application 120 comprising one or more components. Although the simulation system 100 shown in FIG. 1 has a limited number of elements in a certain topology, it may be appreciated that the simulation system 100 may include more or less elements in alternate topologies as desired for a given implementation.

The simulation system 100 may comprise the simulation application 120. The simulation application 120 may be generally arranged to receive a configuration for a simulation and to use the received configuration to produce one or more events for a simulated system. The simulation application 120 may comprise a configuration component 130, command generation component 150, and execution component 170. The simulation application 120 may be arranged to simulate one or more commands in a simulated environment using a task hierarchy 110, wherein simulating the one or more commands comprises executing one or more task commands.

The configuration for the system may include a task hierarchy 110. This task hierarchy 110 may include one or more task commands. A task command may be executed by the simulation system 100 to produce the simulated event. For example, a "file creation" event may be initiated by the execution of a "file creation" task command. Where, for instance, the creation of files of different sizes is supported, the "file creation" task command may specify the file size as either a basic part of the task command or as a parameter to the task command. In some cases, task commands may change behavior based on global settings, such as producing log entries in some cases and producing live simulated results in others.

The task hierarchy 110 may provide for a hierarchical listing of computational events of increasing specificity. For example, at the highest level, computational events may be very broad, such as "consume resource" or "change disk space allocation" or "produce network traffic." Each of these general events may be further defined into sub-categories of events. For example, "produce network traffic" might include such disparate events as taking several minutes to transfer a large file or taking a few milliseconds to send a brief message.

Each of the task entries within the task hierarchy 110 may consist of a task command or a list of linked task entries. The "produce network traffic" high-level event may therefore be a link, in a list of linked task entries, to a task entry with various possibilities for producing network traffic. The "transfer a 1 GB file over 15 minutes" task entry may therefore be a task command providing for the production of such an event within the simulated environment, and this task entry may be contained somewhere within the sub-tree of the "produce network traffic" high-level event. In various cases, this large-file-transfer task command may be varying degrees of distance within the hierarchy from the general "produce network traffic" high-level event.

The simulation application 120 may comprise a configuration component 130 operative to receive task hierarchy 110 from a data store 115. The reception of task hierarchy 110 may be part of the configuration of the simulation application 120 and this configuration may also include the specification of additional parameters for the performance of the simulation. In some cases, the configuration component 130 may be provided with a number of task hierarchies, wherein each task hierarchy corresponds to a particular computational scenario. A scenario may represent a reoccurring pattern of behavior within the represented production environment. For example, a first task hierarchy may correspond to a "normal operation" scenario and a second task hierarchy may correspond to a "hardware failure likely" scenario, with the probability of hardware failures being higher in the "hardware failure likely" scenario than in most other scenarios. The reoccurring pattern of behavior for a scenario may consist of one or more of underutilization of a represented production environment, moderate load on a represented production environment, heavy processing load on a represented production environment, heavy communications load on a represented production environment, heavy disk utilization in a represented production environment, and hardware failure in a represented production environment. The configuration component 130 may therefore be operative to allow a user of the simulation application 120 to specify which scenario they desire to run and to use the associated task hierarchy for running that scenario.

The configuration component 130 may be operative to allow for real-time or pre-configured switching between scenarios during a single simulation, with associated switching between task hierarchies, so as to allow, for example, a demonstration of a monitoring system to evolve from normal operation to spikes of hardware failure within a continuous presentation. For example, the simulation application 120 may execute a first task hierarchy for a first scenario for a first period of time, terminate the execution of the first task hierarchy at a pre-programmed time or in response to a user selection, and then begin execution of a second task hierarchy selected by a user.

The lists of task entries may comprise probabilities associated with each task entry in the list of task entries, such that the linked task entries in the list are weighted according to the desired likelihood of them being selected. A hierarchy in which the lists of task entries are weighted may be described as a weighted hierarchy of task entries or a weighted task hierarchy. The weighting of the tasks within a weighted hierarchy may represent a scenario in a simulated production environment, with different weighting being used to represent different scenarios.

The probabilities may provide a probability distribution across the various task entries in the list, with the probabilities of all the members of each list summing to 100%, representing that if a particular task entry is reached precisely one of its child task entries will be selected for evaluation. In some embodiments, a task entry may include both a list of child task entries that it links to and one or more task commands. The cumulative 100% probabilities may be distributed across both the one or more child task entries and the one or more task commands.

The simulation application 120 may comprise a command generation component 150 operative to evaluate the task hierarchy 110 to determine a task command to execute. The task hierarchy 110 may include a plurality of different task commands available for execution and the command generation component 150 may determine which of this plurality of task commands to specifically execute. This command generation component 150 may receive the task hierarchy 110 from the configuration component 130 and pass the determined task command 155 to an execution component 170 for execution.

Evaluating the task hierarchy 110 to determine a task command 155 to execute may consist of iteratively proceeding through the task hierarchy 110 based on the associated probabilities until a task command 155 is reached. The root task entry is examined first and one of the task entry links and task commands it may contain is selected randomly according to their associated probabilities. It will be appreciated that any of the known techniques for random number and pseudo-random number generation may be used in connection with the random selection. Where a task command is randomly selected, that task command is selected as the task command 155 for execution. Where a task entry link is randomly selected, that link is followed to the linked task entry, which is then recursively evaluated. This logic flow is iteratively repeated until a task command is randomly selected, that task command selected as the task command 155 for execution.

The simulation application 120 may comprise an execution component 170. The execution component 170 may be operative to execute the determined task command 155. In some embodiments, executing the determined task command 155 may consist of generating a log entry. The log entry may consist of text specific to the determined task command 155 indicating its selection. In some embodiments, executing the determined task command 155 may consist of running a simulated command in a simulated environment. The simulated command running in the simulated environment may produce simulated effects appropriate for capture by a monitoring system. The simulated environment represents a production environment, wherein the simulated command represents a command within the represented production environment.

Task commands generally correspond to a simulated environment representing a production environment. Executing a task command may comprise running a simulated command in the simulated environment. For instance, a first task command may correspond to a simulated command allocating, freeing, or accessing disk space in the simulated environment. A second task command may correspond to a simulated command allocating, freeing, or accessing memory in the simulated environment. A third task command may correspond to a simulated command consuming or freeing processor resources in the simulated environment. A fourth task command may correspond to a simulated command consuming or freeing network resources in the simulate environment. In general, task commands may correspond to any behavior of a production environment.

In some cases, attempting to interact with a disk, memory, processor resource, network resource, or other resource may generate simulated warnings, simulated error messages, or other simulated activity other than the simulation of commands being executed as expected. For example, one task command may correspond to a successful attempt to allocate a particular quantity of disk space while another task command may correspond to an unsuccessful attempt to allocate disk space, resulting in an error message. The task hierarchy 110 may arrange these task commands in a same sub-tree corresponding to an attempt to allocate disk space, with a first probability associated with the successful allocation of disk space (and corresponding to the simulation of disk space allocation) and a second probability associated with a failure to allocate disk space (and corresponding to the simulation of an error message being produced). It will be appreciated that the simulation of producing an error message may result in an error message being produced within the simulation. In general, task commands may correspond to any successful or unsuccessful behavior of a production environment.

Figure 2:
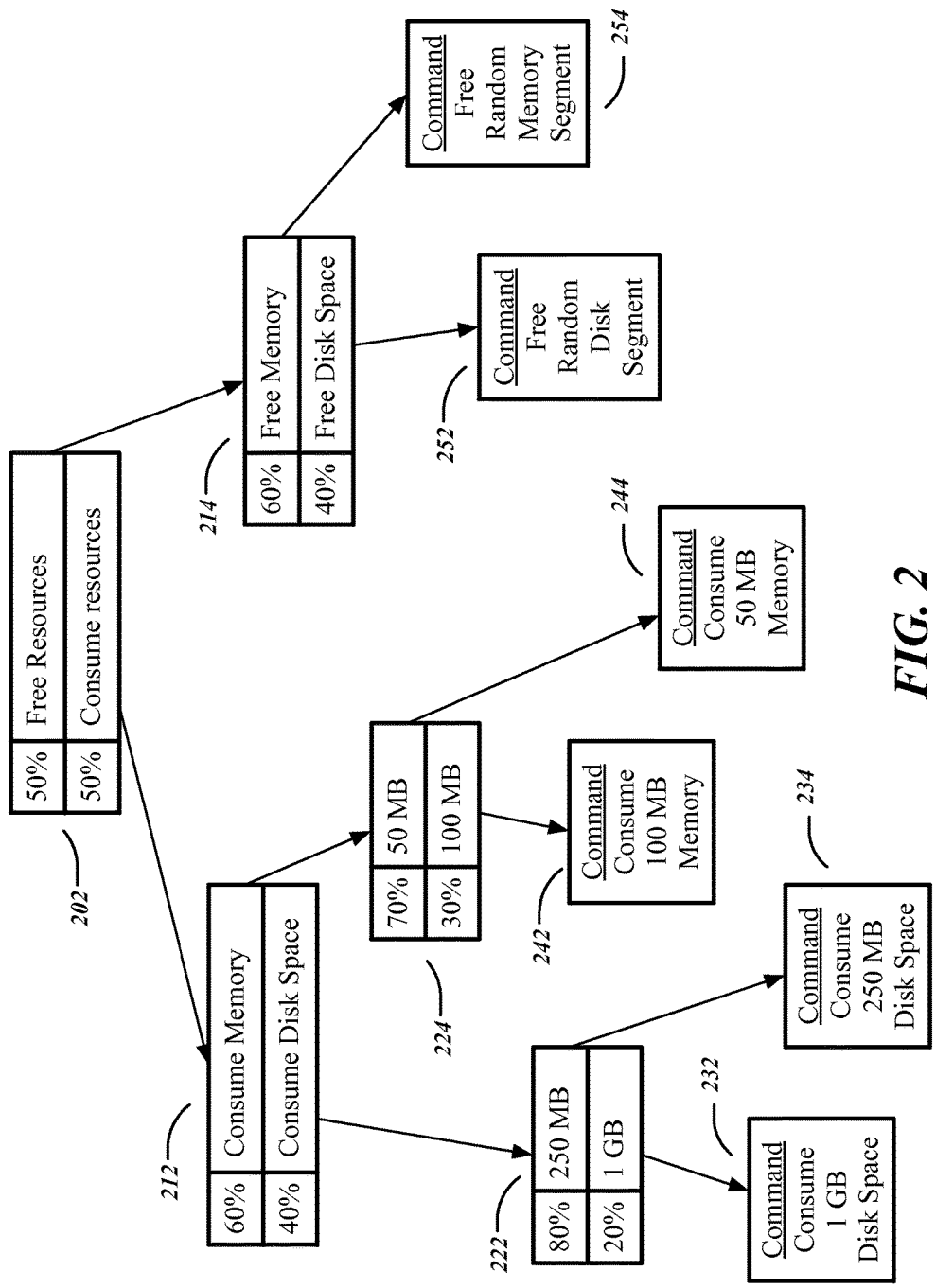
FIG. 2 illustrates an example of a task hierarchy.

FIG. 2 illustrates an example of a task hierarchy 110. As shown in FIG. 2, the task hierarchy 110 is organized into a hierarchical tree with task commands at the leaves. It will be appreciated that while each of the example task entries shown in FIG. 2 have at most two linked subordinate task entries that in various situations the task hierarchy 110 may have any number of subordinate task entries.

Task entry 202 may comprise the root task entry of the task hierarchy 110. Task entry 202 consists of links to two subordinate task entries, task entry 212 and task entry 214, each with a 50% probability assigned. Task entry 212 is reached if the second task entry link "Consume Resources" is randomly selected and task entry 214 is reached if the first task entry link "Free Resources" is randomly selected.

Task entry 212 refines how resources will be consumed. Task entry 212 contains links to two further subordinate task entries, task entry 222 associated with the "Consume Disk Space" link and task entry 224 associated with the "Consume Memory" link, with 40% and 60% probabilities respectively associated. The subordinate task entry 222 allows for random selection between 250 MB and 1 GB of disk space being consumed, while the subordinate task entry 224 allows for random selection between 50 MB and 100 MB of memory being consumed. Task entries 222 and 224 have subordinate to them task entries consisting of task commands. Task entry 232 consists of a task command to consume 1 GB of disk space while task entry 234 consists of a task command to consume 250 MB of disk space. Task entry 242 consists of a task command to consume 100 MB of memory while task command 244 consists of a task command to consume 50 MB of memory. As such, the task entries 232, 234, 242, and 244 represent the various end results that can be produced from the random determination at the root task entry to consume resources. In a hierarchy used for the testing or demonstration of a monitoring system, the set of task hierarchy 110 may be significantly larger and more complex, covering a much broader range of possibilities in much finer detail. It will be appreciated that any event that a monitoring system might monitor could be included with the task hierarchy 110 as an event which can be produced via a task command 155.

Similarly, task entry 214 refines how resources will be freed. With a 60% probability memory may be freed and with a 40% probability disk space may be freed. Freeing memory links to a task entry 254 with a task command to free a random memory segment while freeing disk space links to a task entry 252 with a task command to free a random disk segment. While the selection of a random segment for freeing is used for the illustrated example task commands, task commands which represent specific quantities of resources being released my also be used.

The evaluation of the task hierarchy 110 may therefore consist of starting at the root task entry 202 and selecting a random one of the listed task entry links, such as task entry 212. Task entry 212 may then be recursively evaluated to determine which of its task entry links to follow, such as task entry 224. Task entry 224 may then itself be evaluated to determine that 100 MB of memory will be consumed. With the determination that 100 MB of memory will be used, a task command is reached and the traversal through the hierarchy may conclude. As such, by starting at the root task entry 202 from which any of the possible task commands can be reached, the specific task command is selected in a process of iterative refinement.

This hierarchical format for the task hierarchy 110 may permit easy creation of alternative scenarios. For example, where a scenario calls for rapid expansion in resource use, the "Consume Resources" sub-tree of the illustrated example of FIG. 2 may have associated with it an increased probability over the illustrated example and the "Free Resources" sub-tree may have associated with it a decreased probability. This may allow for an operator to, with a change to a single task entry, significantly change the probability for every task command below it to be selected. Alternatively, additional task entry links may be added to the root task entry 202, or to any other task entry, to allow for addition possibilities at any level of granularity. For example, an additional task entry link, with its own sub-tree of more specific possibilities, may be added to task entry 212 to represent the consumption of network resources. Further, scenarios may be constructed by mixing and matching various portions of existing scenarios, with an operator being able to take combine together complex sub-trees into a single scenario through the creation or modification of only a few task entries.

Figure 3:
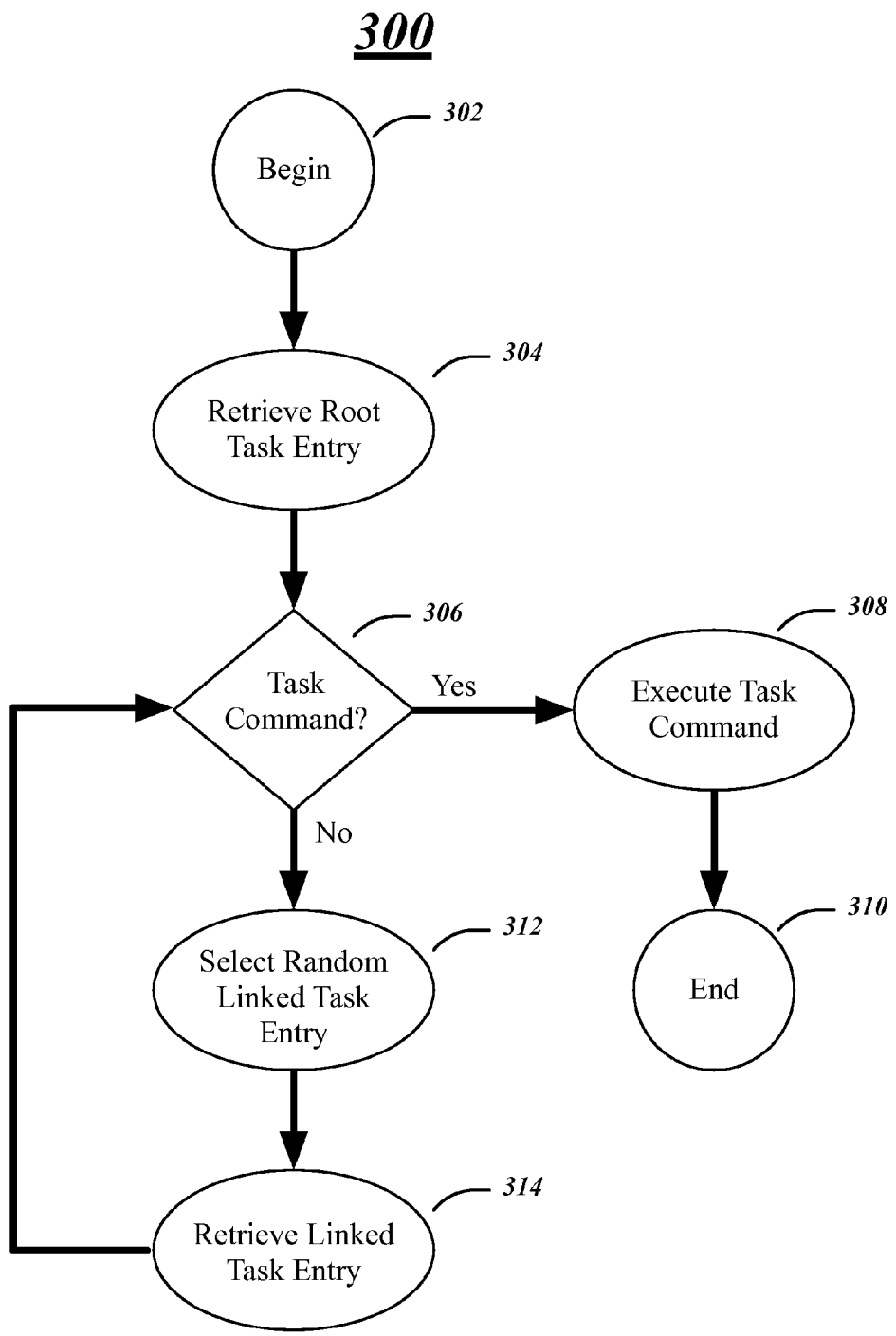
FIG. 3 illustrates an example of a logic flow for evaluating a task hierarchy.

FIG. 3 illustrates an example of a logic flow 300 for evaluating the task hierarchy 110.

As shown in FIG. 3, the logic flow 300 begins at block 302. Block 302 proceeds to block 304.

The logic flow 300 may retrieve the root task entry at block 304. The root task entry of the task hierarchy 110 may be specified in the configuration of the simulation application 120. The root task entry may be selected as the current task entry for evaluation.

The logic flow 300 may determine whether the current task entry being evaluated is a task command at block 306. If the current task entry is a task command, the logic flow 300 proceeds to block 308. If the current task entry is not a task command, the logic flow 300 proceeds to block 312.

The logic flow 300 may execute the task command 155 at block 308. Once a task command 155 is reached in the iterative evaluation of the task hierarchy 110, that task command 155 is selected and provided to the execution component 170. The execution component 170 then executes the determined task command 155. Once the determined task command 155 is executed, the logic flow continues to block 310.

The logic flow 300 may end at block 310. It will be appreciated that the illustrated example of FIG. 3 may comprise a sub-routine or sub-procedure within a larger program, and that the completion of logic flow 300 may not result in the termination of the simulation application 120 but instead merely a portion of the simulation application 120 for the selection and execution of a task command 155.

The logic flow 300 may select a random linked task entry at block 312. As the current task entry is not a task command, it may consists of one or more task entry links. Each of these task entry links has associated with it a probability. Based on a random or pseudo-random draw, one of this task entry links is selected. The logic flow 300 may then proceed to block 314.

The logic flow 300 may retrieve the linked task entry at block 314. The task entry link selected at block 312 is followed and its associated task entry retrieved for evaluation. The logic flow 300 may then proceed to block 306, wherein the retrieved task entry is evaluated in another iteration of this loop of logic flow 300. This loop continues until a task command 155 is selected and executed, such that the logic flow 300 proceeds to the end block 310.

Figure 4:
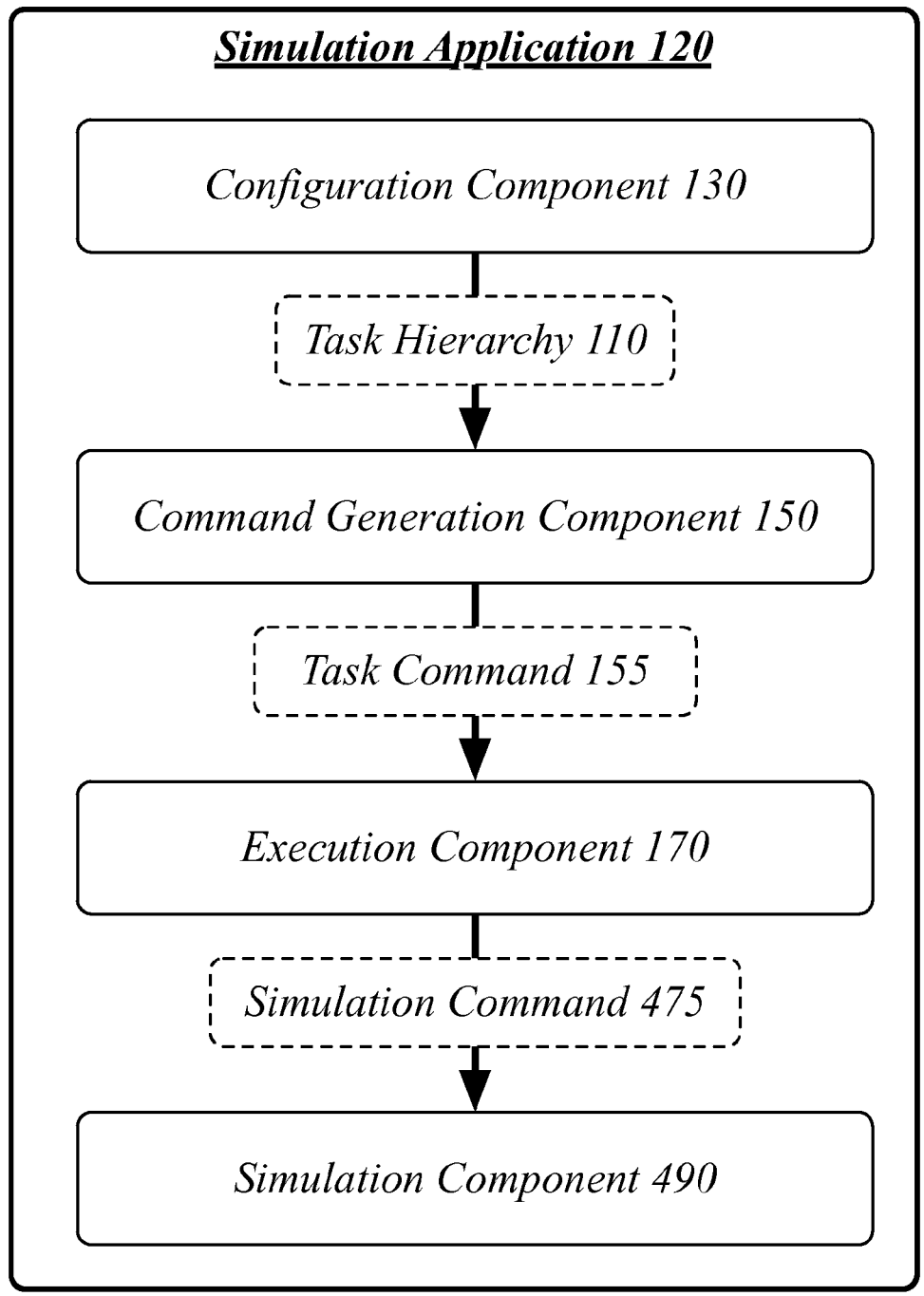
FIG. 4 illustrates an example of the simulation system with a simulation component.

FIG. 4 illustrates an example of the simulation system 100 with a simulation component 490.

As shown in FIG. 4, the simulation component 490 receives a simulation command 475 from the execution component 170. The execution component 170 may be operative to receive the task command 155 and determine the simulation command 475 based on the task command 155. In some cases, the simulation command 475 may be the same as the task command 155, with the execution component 170 providing the task command 155 to the simulation component 490 as the simulation command 475. In some cases, the simulation command 475 may be determined according to a table lookup, database retrieval, or other procedure by which the task command 155 is translated to a format appropriate for the simulation component 490.

The task command 155 may comprise an event and one or more parameters for that event. For example, a "consume disk space" event may have associated with it a parameter indicating the quantity of disk space to consume. The simulation command 475 may therefore consist of a function call associated with that event with the function call taking the one or more parameters associated with the event in the task command 155. Executing the task command 155 using the simulation component 490 may therefore comprise the specification of a function by the task command 155 being translated into the actual execution of that function by the simulation component 490.

The simulation component 490 may produce output as appropriate to the simulation command 475. In some embodiments, this may include the actual performance of the determined task command 155, such as the actual allocation of disk space on a physical hard drive. In other embodiments, producing output for the simulation command 475 may instead consist of producing output sufficient to communicate the occurrence of an event to a monitoring system without the actual performance of the event.

Figure 5:
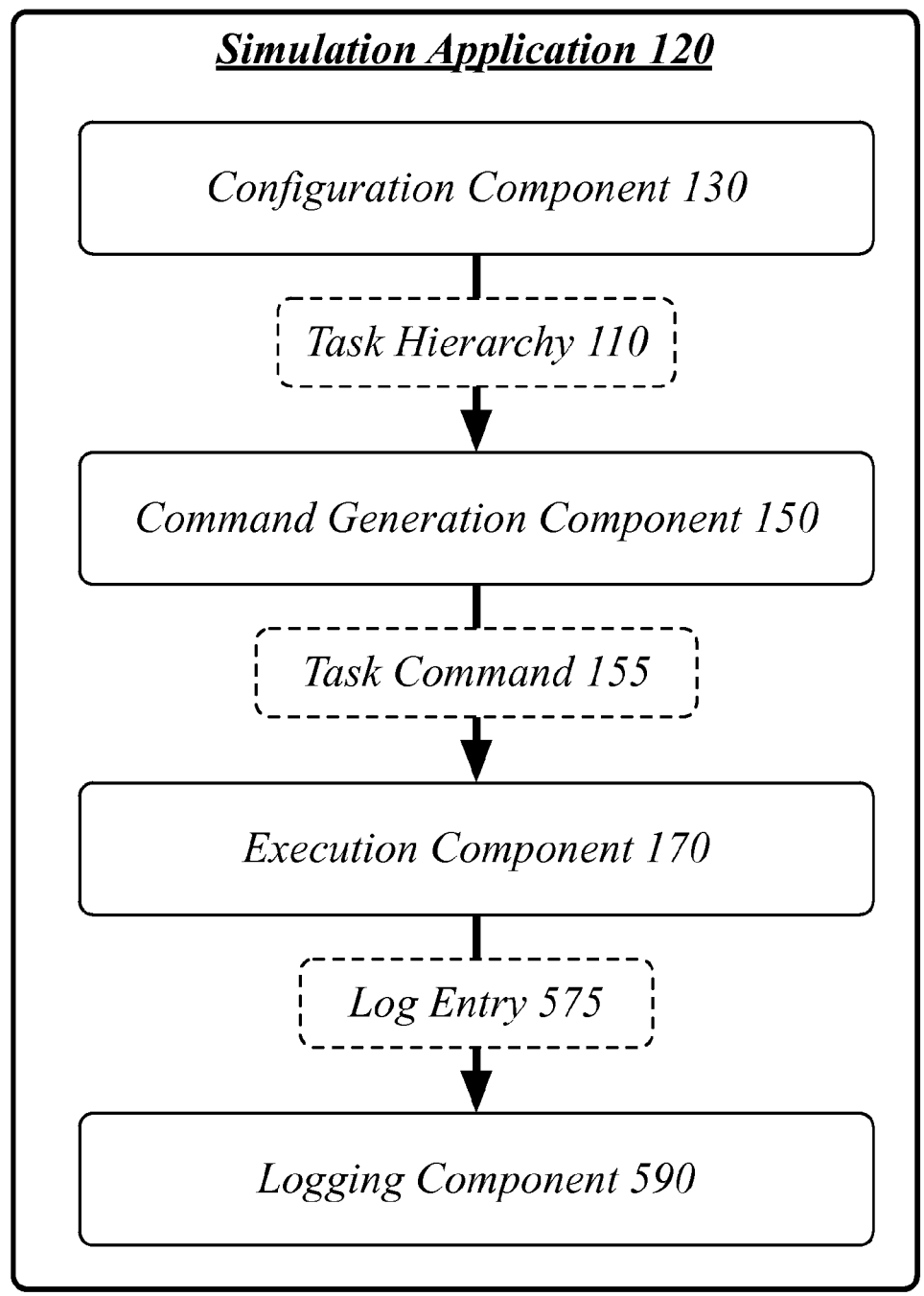
FIG. 5 illustrates an example of the simulation system with a logging component.

FIG. 5 illustrates an example of the simulation system 100 with a logging component 590.

As shown in FIG. 5, the logging component 590 receive a log entry 575 from the execution component 170. The log entry 575 may be produced based on the task command 155 and may describe, encapsulate, or otherwise indicate the occurrence of the event indicated by the task command 155. In some cases, the task command 155 may specifically indicate that a log entry 575 is to be made. In some cases, the task command 155 may be converted into a log entry 575 based on a translation scheme.

The logging component 590 may be operative to receive the log entry 575 and to store the log entry 575 in a log file, log store, log database, or other technique for storing a log. The log entry 575 may have included with it a time, date, and other information indicating the timing of the event. The log entry 575 may comprise a general name for the event, such as "Consume Memory," as well as specific parameters, such as an amount of memory consumed.

Where the simulation application 120 produces multiple events, the logging component 590 may log all of the events in sequence, such that the stored log contains all of the produced events. The logging component 590 may be operative to, at the completion of a sequence of events, to output, export, or otherwise produce for an operator the stored log containing log entries for the full sequence of events.

Figure 6:
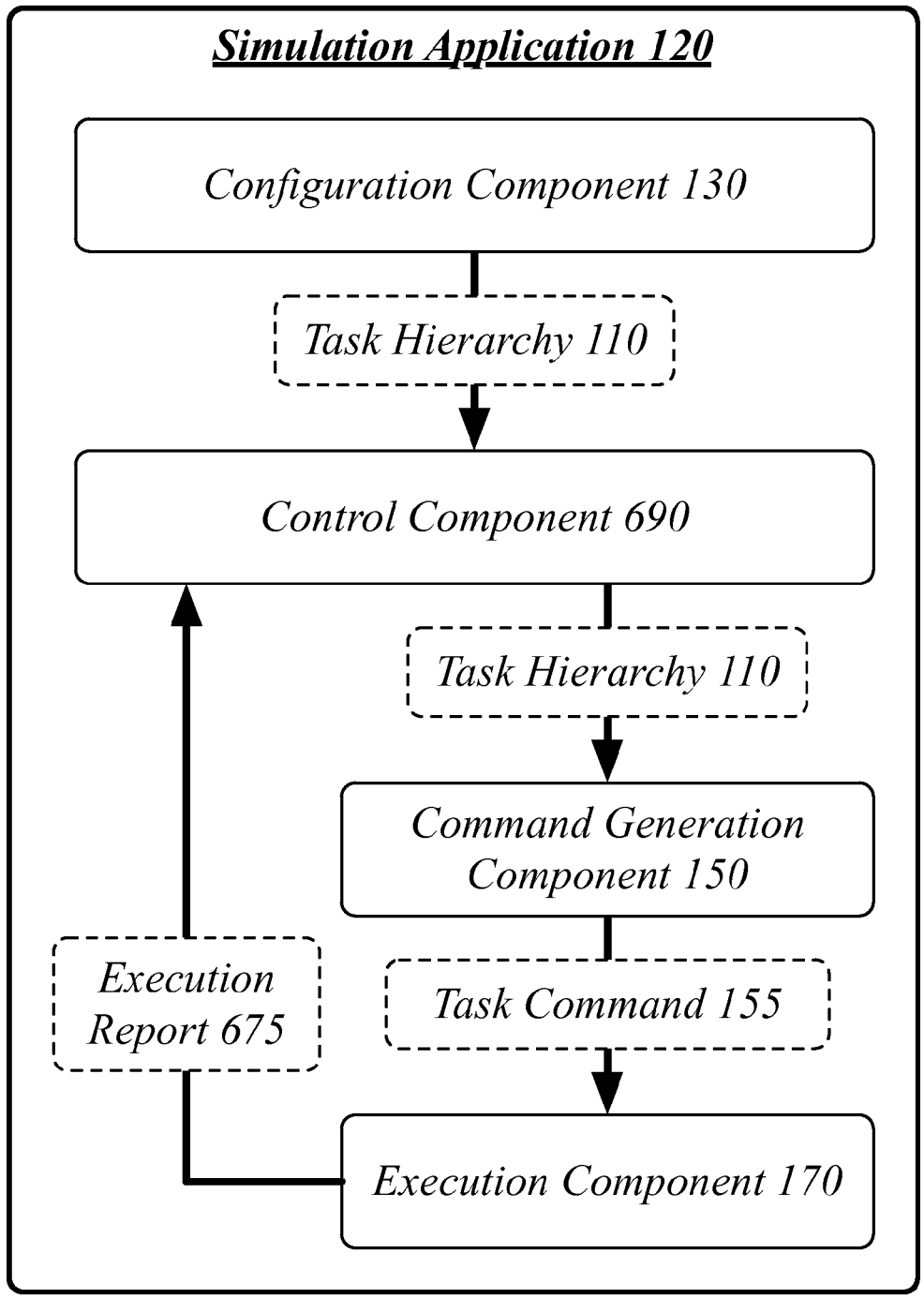
FIG. 6 illustrates an example of the simulation system with a control component.

FIG. 6 illustrates an example of the simulation system 100 with a control component 690.

In some cases, a simulation of a particular level of activity may be desired. An operator of the simulation application 120 may specify a desired level of activity, the desired level of activity received by the configuration component 130 from the operator. In some cases, the desired level of activity may be specified numerically, such as a number of events per unit of time, or may be specified conceptually, such as a low or high level of activity. Various techniques may be used for the specification of the desired level of activity.

The control component 690 may be operative to receive the desired level of activity from the configuration component 130. The control component 690 may evaluate the task hierarchy 110 iteratively using the command generation component 150 to determine task commands to execute. The control component 690 may execute the determined task commands using the execution component 170. The task hierarchy 110 may be evaluated iteratively at a rate determined based on the specified desired level of activity. In some cases, such as where a rate is directly indicated by an operator, the rate may precisely correspond to the indicated level of activity. In some cases, the rate may be a translation of a more descriptive setting determined by an operator.

The execution component 170 may be operative to return an execution report 675 to the control component 690. The execution report 675 may be in addition to any output produced by the execution component 170 in relation to the simulation or logging of events. The execution report 675 may indicate to the control component 690 that the command generation component 150 and execution component 170 have successfully determined a task command 155 and executed it, and that the components are ready to perform another iteration. The control component 190 may be operative to perform the next iteration in response to the receive execution report 675 after a period of time determined to produce the desired rate.

Included herein is a flow chart representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive the task hierarchy 110 at block 702. For example, the task hierarchy 110 may be received as containing a particular scenario for use in developing, testing, or demonstrating a monitoring system. The task hierarchy 110 may be user-defined as representing this particular scenario. The task hierarchy 110 may be created specifically for this particular scenario or may include task entries, possibly including entire or partial sub-trees, from one or more previously-created scenarios. The task hierarchy 110 may comprise a hierarchical listing of computational events of increasing specificity, wherein each task entry may indicate a task commands or may indicate one or more task entry links. Each of the task commands and/or task entry links may have associated with it a probability of being selected during the evaluation of the task entry. The task commands of the task hierarch 110 may correspond to a simulated environment representing a production environment in that they are associated with and can be used to initiate the simulation of events within the simulated environment. The task hierarchy 110 may be a tree, such that no subordinate task entry is linked to by more than one task entry higher in the tree. Alternatively, the task hierarchy 110 may be a directed graph, such that multiple task entries link to the same subordinate task entry.

The logic flow 700 may simulate one or more commands in the simulated environment using the task hierarchy 110 at block 704. Simulating each of the one or more commands may comprise traversing through the task hierarchy 110 based on the associated probabilities until a task command is reached and executing the task command as a simulated command in the simulated environment. The hierarchical listing of computational events may be recursively examined until a task command 155 is reached, wherein each task entry examined is randomly determined according to the associated probabilities to produce either a task command or a task entry link. Where a task command is produced, this task command is used as the task command 155 for execution. Where a task entry link is produced, the task entry link is followed and the linked task entry is itself evaluated.

Executing a determine task command 155 may comprise performing the simulation of a simulated command. The extent to which the simulation of a command corresponds to the actual performance of a command may vary according to the intended use of the simulation. For example, the determined task command 155 may be simulated within a simulated environment to produce simulated monitoring information. Alternatively, the determined task command 155 may be logged as having been determined without being simulated. In some cases, a logged task command 155 may be later simulated within a simulated environment, such as where the simulation application 120 is used to generate a log file for use in a later test or demonstration.

In some cases, block 704 may be iteratively repeated to produce a sequence of simulated events for monitoring by a monitoring system. In some cases, multiple instances of block 704 may be performed in parallel so as to produce parallel simulated events, such as may occur with multi-processing systems and multi-server computing environments.

The embodiments are not limited to this example.

Figure 8:
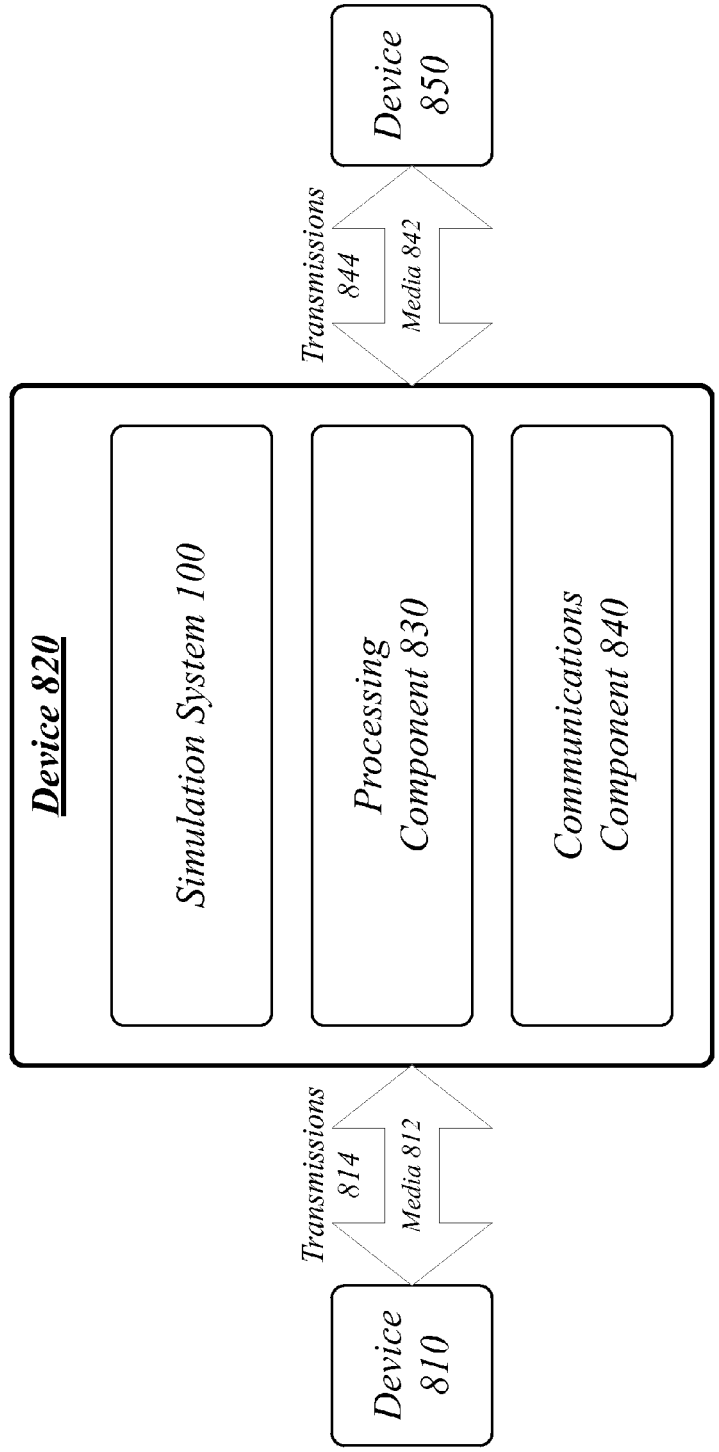
FIG. 8 illustrates an example of a centralized system for the system of FIG. 1.

FIG. 8 illustrates a block diagram of a centralized system 800. The centralized system 800 may implement some or all of the structure and/or operations for the simulation system 100 in a single computing entity, such as entirely within a single device 820.

The device 820 may comprise any electronic device capable of receiving, processing, and sending information for the simulation system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the simulation system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the simulation system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated transmission, and so forth. Examples of wireless communications media may include acoustic, radio-frequency (RF) spectrum, infrared and other wireless media.

The device 820 may communicate with other devices 810, 850 over a communications media 812, 842, respectively, using communications transmissions 814, 844, respectively, via the communications component 840. The devices 810, 850 may be internal or external to the device 820 as desired for a given implementation.

Device 810 may correspond to a user system used by an operator for accessing and using simulation system 100. Transmissions 814 sent over media 812 may therefore correspond to the transmission of task hierarchy 110 or to the selection of task hierarchy 110 from among various scenarios stored by the simulation system 100.

Device 850 may correspond to a monitoring system being tested or demonstrated using the simulation system 100. As such, transmissions 844 sent over media 842 may correspond to the transmission of simulated events from the simulation system 100 to the monitoring system. The monitoring system on device 850 may display the results of its monitoring for an operator, such as the operator of device 810. Alternatively, device 810 may be used in advance to generate a sequence of events for demonstrating the monitoring system which are used with device 850 at a later time.

Figure 9:
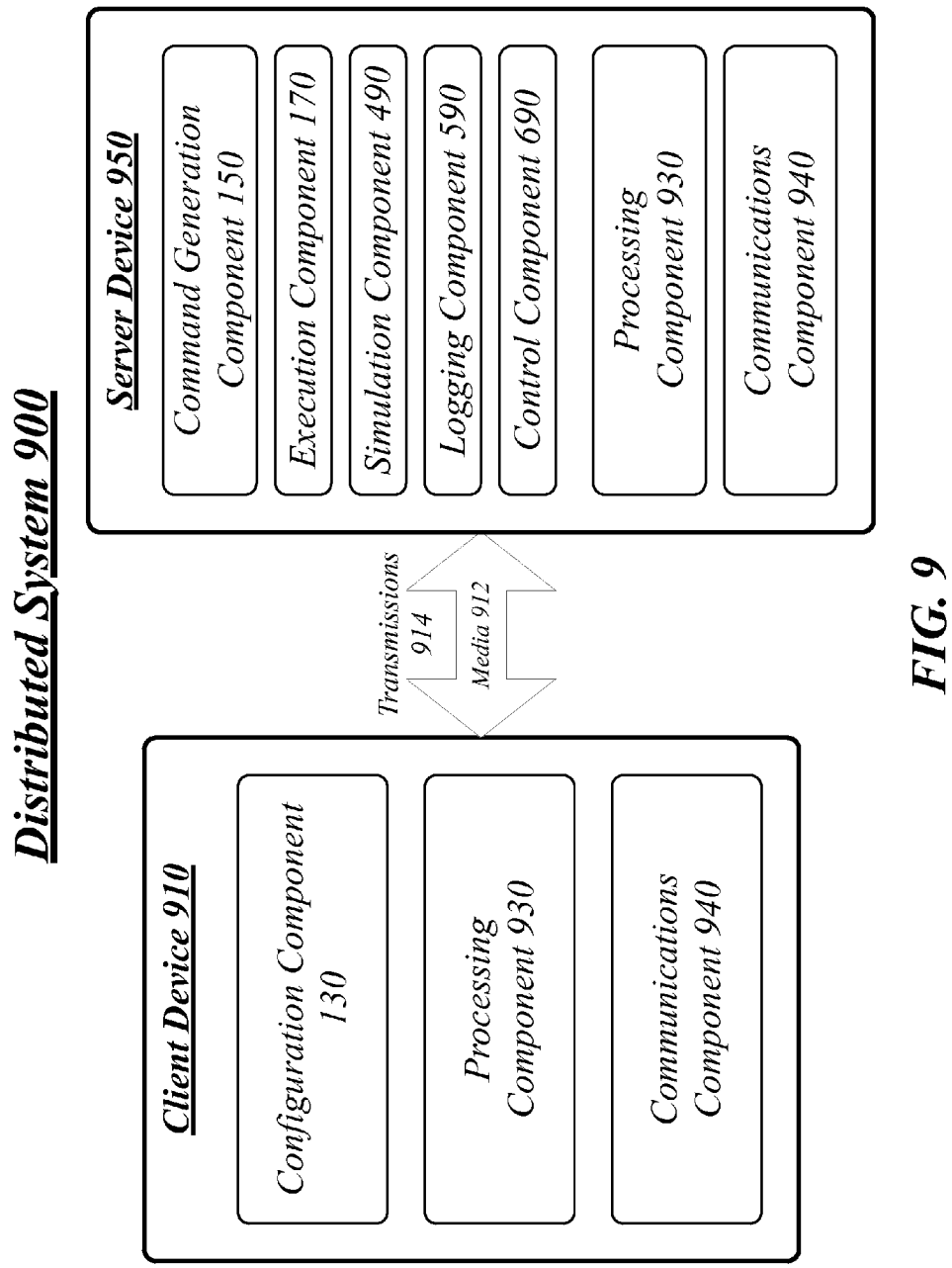
FIG. 9 illustrates an example of a distributed system for the system of FIG. 1.

FIG. 9 illustrates a block diagram of a distributed system 900. The distributed system 900 may distribute portions of the structure and/or operations for the simulation system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the client device 820 as described with reference to FIG. 8. For instance, the client system 910 and the server device 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications transmissions 914 via the communications components 940.

The client device 910 may comprise or employ one or more client programs that operate to perform various methodologies in accordance with the described embodiments. In one embodiment, for example, the client device 910 may implement the configuration component 130. An operator may use the configuration component 130 as an application on the client device 910 for the generation of linked task entry sets representing various scenarios and the communication of task hierarchy 110 to the server device 950 for simulation. Transmissions 914 sent over media 912 may therefore correspond to the transmission of the task hierarchy 110 to the server device 950 and the reception of the results of the simulation.

The server device 950 may comprise or employ one or more server programs that operate to perform various methodologies in accordance with the described embodiments. In one embodiment, for example, the server device 950 may implement the command generation component 150, execution component 170, simulation component 490, logging component 590, and control component 690. It will be appreciated that these components may be implemented by a single machine or may be distributed across multiple machines. Further, one or more other server devices may be used for a monitoring system, such as where a monitoring system is being developed, tested, or demonstrated using the simulation system 100.

Figure 10:
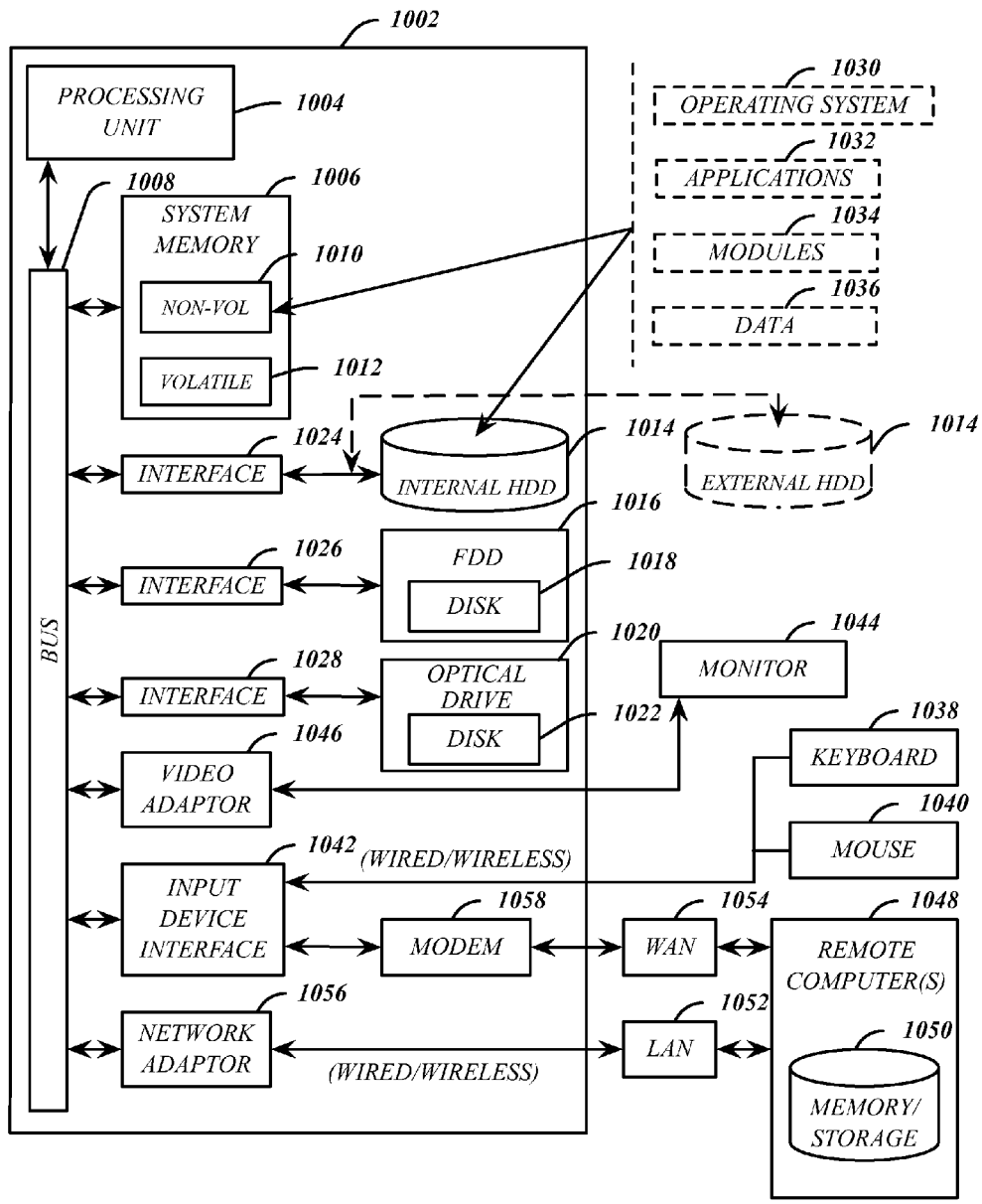
FIG. 10 illustrates an example of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmissions. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the simulation system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
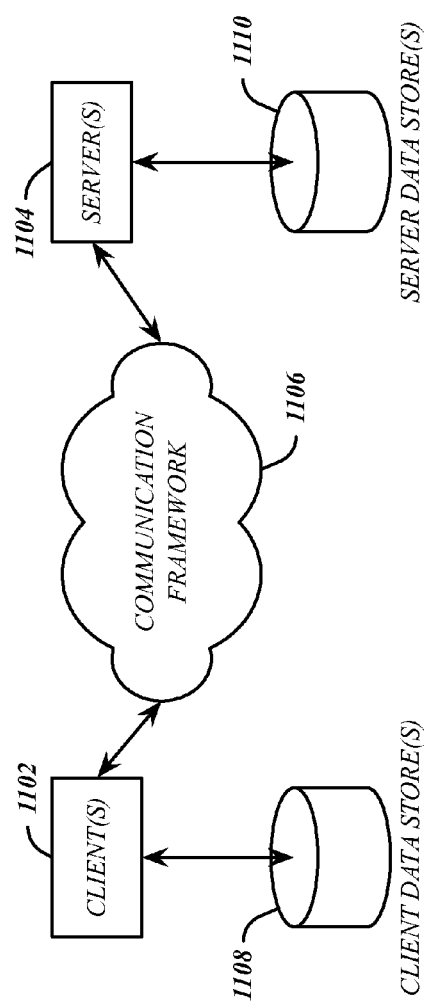
FIG. 11 illustrates an example of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server device 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The communication framework 1106 may be operative to provide communication between members of a distributed computing system, grid computing system, or other multi-computer computing system. For example, the communication framework 1106 may connect together geographically co-located computation devices cooperatively processing to solve one or more computational tasks. Alternatively or additionally, the communication framework 1106 may connect together geographically-separated computational devices performing mostly-independent processing components of a computational task, such as in grid computing. One or both of the client data store 1108 and server data store 1110 may form all or some of a distributed file system, such as may be provided by Apache® Hadoop@.

Some systems may use Hadoop@, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. At least one non-transitory computer-readable storage medium comprising instructions that, when executed, cause a system to:
receive a task hierarchy from a data store, the task hierarchy comprising a plurality of task entries, each task entry comprising a list of task entries or a task command, the list of task entries comprising probabilities associated with each task entry in the list of task entries, wherein task commands are executed in a simulated environment to cause actual performance of events to cause usage of physical computing resources, and wherein each probability provides a weight for selection of an associated task entry when traversing the task hierarchy; and
execute one or more of the task commands in the simulated environment, wherein executing each of the one or more task commands comprises traversing through the task hierarchy based on the associated probabilities until a task command is reached and executing the task command to cause actual performance of an event to cause usage of at least one of the physical computing resources in the simulated environment.

2. The non-transitory computer-readable storage medium of claim 1, the task hierarchy organized into a hierarchal tree having task entries as sub-trees and task commands as leaves.

3. The computer-readable storage medium of claim 1, the task hierarchy being a weighted task hierarchy, wherein weighting of the task entries within the weighted task hierarchy represents a scenario in a represented production environment.

4. The non-transitory computer-readable storage medium of claim 1, the task hierarchy corresponding to a scenario, the scenario representing a reoccurring pattern of behavior within a represented production environment.

5. The non-transitory computer-readable storage medium of claim 4, the reoccurring pattern of behavior comprising one or more of underutilization of the represented production environment, processing load on the represented production environment, communications load on the represented production environment, disk utilization in the represented production environment, and hardware failure in the represented production environment.

6. The non-transitory computer-readable storage medium of claim 1, wherein one or more of the commands simulates allocating, freeing, or accessing disk space in the simulated environment.

7. The non-transitory computer-readable storage medium of claim 1, wherein one or more of the commands simulates allocating, freeing, or accessing memory in the simulated environment.

8. The non-transitory computer-readable storage medium of claim 1, wherein one or more of the commands simulates consuming or freeing processor resources in the simulated environment.

9. The non-transitory computer-readable storage medium of claim 1, comprising further instructions that, when executed, cause a system to:
receive a desired level of activity; and
evaluate the task entries iteratively to determine task commands to execute and executing the determined task commands, the task entries evaluated iteratively at a rate determined based on the desired level of activity.

10. The non-transitory computer-readable storage medium of claim 1, the data store storing a plurality of task hierarchies, wherein each of the plurality of task hierarchies is associated with a scenario.

11. The non-transitory computer-readable storage medium of claim 10, comprising further instructions that, when executed, cause a system to:
receive a selection of a scenario; and
retrieve the task hierarchy associated with the selected scenario from the data store for traversal and execution.

12. The non-transitory computer-readable storage medium of claim 10, comprising further instructions that, when executed, cause a system to:
receive a desired level of activity;
receive a selection of a scenario;
retrieve the task hierarchy associated with the selected scenario from the data store;
evaluate the task hierarchy iteratively to determine task commands to execute and executing the determined task commands, the task hierarchy evaluated iteratively at a rate determined based on the desired level of activity;
receive a second selection of a second scenario;
terminate the evaluating of the task hierarchy;
retrieve a second task hierarchy associated with the selected second scenario from the data store; and
evaluate the second task hierarchy iteratively to determine task commands to execute and executing the determined task commands, the second task hierarchy evaluated iteratively at the rate determined based on the desired level of activity.

13. A computer-implemented method, comprising:
receiving a task hierarchy from a data store, the task hierarchy comprising a plurality of task entries, each task entry comprising a list of task entries or a task command, the list of task entries comprising probabilities associated with each task entry in the list of task entries, wherein task commands are executed in a simulated environment to cause actual performance of events to cause usage of physical computing resources, and wherein each probability provides a weight for selection of an associated task entry when traversing the task hierarchy; and
executing one or more of the task commands in the simulated environment, wherein executing each of the one or more task commands comprises traversing through the task hierarchy based on the associated probabilities until a task command is reached and executing the task command to cause actual performance of an event to cause usage of at least one of the physical computing resources in the simulated environment.

14. The method of claim 13, the task hierarchy organized into a hierarchal tree having task entries as sub-trees and task commands as leaves.

15. The method of claim 13, the task hierarchy being a weighted task hierarchy, wherein weighting of the task entries within the weighted task hierarchy represents a scenario in a represented production environment.

16. The method of claim 13, the task hierarchy corresponding to a scenario, the scenario representing a reoccurring pattern of behavior within a represented production environment.

17. The method of claim 16, the reoccurring pattern of behavior comprising one or more of underutilization of the represented production environment, processing load on the represented production environment, communications load on the represented production environment, disk utilization in the represented production environment, and hardware failure in the represented production environment.

18. The method of claim 13, wherein one or more of the commands simulates allocating, freeing, or accessing disk space in the simulated environment.

19. The method of claim 13, wherein one or more of the commands simulates allocating, freeing, or accessing memory in the simulated environment.

20. The method of claim 13, wherein one or more of the commands simulates consuming or freeing processor resources in the simulated environment.

21. The method of claim 13, further comprising:
receiving a desired level of activity; and
evaluating the task hierarchy iteratively to determine task commands to execute and executing the determined task commands, the task hierarchy evaluated iteratively at a rate determined based on the desired level of activity.

22. The method of claim 13, the data store storing a plurality of task hierarchies, wherein each of the plurality of task hierarchies is associated with a scenario.

23. The method of claim 22, further comprising:
receiving a selection of a scenario; and
retrieving the task hierarchy associated with the selected scenario from the data store for traversal and execution.

24. The method of claim 22, further comprising:
receiving a desired level of activity;
receiving a selection of a scenario;
retrieving the task hierarchy associated with the selected scenario from the data store;
evaluating the task hierarchy iteratively to determine task commands to execute and executing the determined task commands, the task hierarchy evaluated iteratively at a rate determined based on the desired level of activity;
receiving a second selection of a second scenario;
terminating the evaluating of the task hierarchy;
retrieving a second task hierarchy associated with the selected second scenario from the data store; and
evaluating the second task hierarchy iteratively to determine task commands to execute and executing the determined task commands, the second task hierarchy evaluated iteratively at the rate determined based on the desired level of activity.

25. An apparatus, comprising:
a processor circuit on a device;
a data store;
a memory storing instructions operable on the processor circuit, the instructions, when executed, cause the processor circuit to:
execute one or more task commands in a simulated environment;
receive a task hierarchy from a data store, the task hierarchy comprising a plurality of task entries, each task entry comprising a list of task entries or a task command, the list of task entries comprising probabilities associated with each task entry in the list of task entries, wherein task commands are executed in the simulated environment to cause actual performance of events to cause usage of physical computing resources, and wherein each probability provides a weight for selection of an associated task entry when traversing the task hierarchy;
determine the one or more task commands for execution by traversing through the task hierarchy based on the associated probabilities until the one or more task commands are reached; and
execute the one or more task commands to cause actual performance of an event to cause usage of at least one of the physical computing resources in the simulated environment.

26. The apparatus of claim 25, the task hierarchy organized into a hierarchal tree having task entries as sub-trees and task commands as leaves.

27. The apparatus of claim 25, the task hierarchy being a weighted task hierarchy, wherein weighting of the task entries within the weighted task hierarchy represents a scenario in a represented production environment.

28. The apparatus of claim 25, the task hierarchy corresponding to a scenario, the scenario representing a reoccurring pattern of behavior within a represented production environment.

29. The apparatus of claim 28, the reoccurring pattern of behavior comprising one or more of underutilization of the represented production environment, processing load on the represented production environment, communications load on the represented production environment, disk utilization in the represented production environment, and hardware failure in the represented production environment.

30. The apparatus of claim 25, wherein one or more of the commands simulates allocating, freeing, or accessing disk space in the simulated environment.

31. The apparatus of claim 25, wherein one or more of the commands simulates allocating, freeing, or accessing memory in the simulated environment.

32. The apparatus of claim 25, wherein one or more of the commands simulates consuming or freeing processor resources in the simulated environment.

33. The apparatus of claim 25,
the processor circuit to receive a desired level of activity and evaluate the task hierarchy iteratively to determine task commands to execute and executing the determined task commands, the task entries evaluated iteratively at a rate determined based on the desired level of activity.

34. The apparatus of claim 25, the data store storing a plurality of task hierarchies, wherein each of the plurality of task hierarchies is associated with a scenario.

35. The apparatus of claim 34,
the processor circuit to receive a selection of a scenario and retrieve the task hierarchy associated with the selected scenario from the data store for traversal and execution.

36. The apparatus of claim 34,
the processor circuit to:
receive a desired level of activity,
receive a selection of a scenario,
retrieve the task hierarchy associated with the selected scenario from the data store,
receive a second selection of a second scenario,
retrieve a second task hierarchy associated with the selected second scenario from the data store,
evaluate the task hierarchy iteratively to determine task commands to execute and executing the determined task commands, the task hierarchy evaluated iteratively at a rate determined based on the desired level of activity,
terminate the evaluating of the task hierarchy upon reception of the second selection, and
evaluate the second task hierarchy iteratively to determine task commands to execute and executing the determined task commands, the second task hierarchy evaluated iteratively at the rate determined based on the desired level of activity.

* * * * *